United States Patent
Molinari

(10) Patent No.: US 11,410,356 B2
(45) Date of Patent: Aug. 9, 2022

(54) SYSTEMS AND METHODS FOR REPRESENTING OBJECTS USING A SIX-POINT BOUNDING BOX

(71) Applicant: Toyota Research Institute, Inc., Los Altos, CA (US)

(72) Inventor: Daniele Molinari, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 176 days.

(21) Appl. No.: 15/931,715

(22) Filed: May 14, 2020

(65) Prior Publication Data

US 2021/0358184 A1    Nov. 18, 2021

(51) Int. Cl.
| | | |
|---|---|---|
| *G06T 7/70* | (2017.01) | |
| *G06T 7/10* | (2017.01) | |
| *B60W 30/09* | (2012.01) | |
| *B60W 60/00* | (2020.01) | |
| *G06T 11/20* | (2006.01) | |

(52) U.S. Cl.
CPC ........... *G06T 11/203* (2013.01); *B60W 30/09* (2013.01); *B60W 60/001* (2020.02); *G06T 7/10* (2017.01); *G06T 7/70* (2017.01); *B60W 2420/42* (2013.01); *B60W 2420/52* (2013.01); *G06T 2207/30252* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 9,703,291 B1 | 7/2017 | Zhu et al. | |
| 10,438,371 B2 | 10/2019 | Xu et al. | |
| 10,503,999 B2 | 12/2019 | Rao et al. | |
| 2009/0210367 A1 | 8/2009 | Armstrong et al. | |
| 2017/0220876 A1* | 8/2017 | Gao | G06K 9/3241 |
| 2018/0130215 A1 | 5/2018 | Schulter et al. | |
| 2018/0307935 A1 | 10/2018 | Rao et al. | |
| 2019/0004166 A1 | 1/2019 | Orlowski et al. | |
| 2019/0094040 A1* | 3/2019 | Lewis | G06K 9/00805 |
| 2019/0258878 A1 | 8/2019 | Koivisto et al. | |

(Continued)

OTHER PUBLICATIONS

Du et al., "REPGN: Object Detection with Relational Proposal Graph Network", found at: arXiv:1904.08959v1 [cs.CV] Apr. 18, 2019.

(Continued)

*Primary Examiner* — Idowu O Osifade
(74) *Attorney, Agent, or Firm* — Christopher G. Darrow; Darrow Mustafa PC

(57) ABSTRACT

System, methods, and other embodiments described herein relate to improving a representation of objects in a surrounding environment. In one embodiment, a method includes, in response to receiving sensor data depicting the surrounding environment including a corridor that defines a left boundary and a right boundary, identifying at least one object from the sensor data. The method includes transforming segmented data from the sensor data that represents the object into a bounding box by defining the bounding box according to six points relative to the corridor. The method includes providing the six points of the bounding box as a reduced representation of the object.

20 Claims, 10 Drawing Sheets

(56) References Cited

U.S. PATENT DOCUMENTS

2019/0371052 A1  12/2019  Kehl et al.

OTHER PUBLICATIONS

Fei et al., "Better Understanding Hierarchical Visual Relationship for Image Caption", found at: arXiv:1912.01881v1 [cs.CV] Dec. 4, 2019.

Feng et al. "Relation Graph Network for 3D Object Detection in Point Clouds", found at: arXiv:1912.00202v1 [cs.CV] Nov. 30, 2019.

* cited by examiner

SYSTEMS AND METHODS FOR REPRESENTING OBJECTS USING A SIX-POINT BOUNDING BOX

TECHNICAL FIELD

The subject matter described herein relates, in general, to systems and methods for representing a detected object using a six-point bounding box, and, more particularly, to intelligently and efficiently represent the object by transforming sensor data representing the object into the six-point bounding box.

BACKGROUND

Various devices (e.g., robots, autonomous vehicles, etc.) that provide information about a surrounding environment use sensors to perceive obstacles and other aspects of the surrounding environment. For example, a robotic device may use information from the sensors to develop an awareness of the surrounding environment in order to navigate through the environment and avoid hazards. In particular, the robotic device uses the perceived information to differentiate between various entities, plan maneuvers in relation to the entities, and so on. However, the ability to use this information relies on the ability of the underlying systems to accurately and efficiently process the information into the noted perceptions. For example, various systems may identify a general location and boundaries of a detected object in the surrounding environment using a bounding box. In general, this bounding box is a simple representation that frames the object using a rectangle that is formed according to outermost points on the object.

For example, in relation to a person, a bonding box may encompass a height based on the top of the head and a width based on outer points on the shoulders or arms. Thus, while the bounding box is generally a simple representation, the bounding box can overlap a significant amount of area that is not occupied by the object. Continuing with the example of the person, when a person is standing in any way other than with arms to the side, the bounding box can become significantly enlarged in relation to the person. For example, if the person extends their hands and arms upward and/or outward, the person may then only consume 60%-70% of the bounding box. Similarly, features on or along roadways, such as vegetation, potholes, etc., may include sections that extend significantly beyond a main section of the object, thereby resulting in the bounding box occluding a larger area than what the object actually occupies. Accordingly, when this overextension of the bonding box occurs in relation to features on or along a roadway or other area in which a device is attempting to navigate, the area of the bounding box is considered to be occupied when, in reality, a significant portion may actually be passable. As such, representing objects using simple rectangular bounding boxes can represent difficulties in relation to perceptions of other systems that rely on the bounding boxes accurately indicating occupied space.

SUMMARY

In one embodiment, example systems, and methods relate to an improved approach to representing a detected object using a bounding box. As previously noted, accurately representing objects detected in a surrounding environment can be a difficult task. For example, using sensor data to directly represent an object can be computationally intensive because of the amount of data that is contained within a direct observation. By contrast, using a simple rectangular bounding box can be an oversimplification that causes unoccupied space within an environment appear to be occupied due to the overextension of the bounding box around the outer boundaries of the object.

Therefore, in one embodiment, a system is disclosed that improves the representation of objects identified in a surrounding environment. For example, in one aspect, the disclosed system initially acquires sensor data from one or more sensors that perceive the surrounding environment. The sensor data includes representations of objects that are present within a field-of-view of the sensor. Thus, the disclosed system may identify objects from the sensor data, such as a vehicle or another object, and then generate a six-point bounding box to represent the object instead of using segmented data from the sensor data.

For example, the system may define a reference system within which to define the bounding box. The reference system may include boundaries of a present corridor (e.g., road or lane markers) in addition to a further abstracted reference relative to the boundaries, such as a centerline that is parallel to and bisects a space between the boundaries. Thus, the boundaries generally include a left boundary and a right boundary relative to, for example, a direction of travel of an observing vehicle, and forms the reference system using the boundaries and the centerline.

Using the reference system, the disclosed system can then determine six points relative to the reference system to define the detected object. In one arrangement, the disclosed system determines distances in the reference system according to outward points of the object. That is, the object generally has as a shape regardless of the particular class/category where, according to a current orientation, some portion of the vehicle is extending further in each direction of the reference system. Thus, the disclosed system identifies the noted points of the object and projects the points against the reference system to derive the six-points defining the bounding box. Thus, the six points may include actual coordinates in the reference system or may be otherwise defined according to six separate distances determined from the projections. In any case, the disclosed system generates the six-point bounding box as an improved representation of the object that is an efficient and adaptable representation, thereby avoiding difficulties with erroneously defining unoccupied space as occupied.

In one embodiment, an observation system for improving a representation of objects in a surrounding environment is disclosed. The observation system includes one or more processors and a memory communicably coupled to the one or more processors. The memory stores a detection module including instructions that, when executed by the one or more processors, cause the one or more processors to, in response to receiving sensor data depicting the surrounding environment including a corridor that defines a left boundary and a right boundary, identify at least one object from the sensor data. The memory stores a reference module including instructions that, when executed by the one or more processors, cause the one or more processors to transform segmented data from the sensor data that represents the object into a bounding box by defining the bounding box according to six points relative to the corridor. The reference module further includes instructions to provide the six points of the bounding box as a reduced representation of the object.

In one embodiment, a non-transitory computer-readable medium for improving a representation of objects in a surrounding environment and including instructions that, when executed by one or more processors, cause the one or more processors to perform various functions. The instructions including instructions to, in response to receiving sensor data depicting the surrounding environment, including a corridor that defines a left boundary and a right boundary, identify at least one object from the sensor data. The instructions including instructions to transform segmented data from the sensor data that represents the object into a bounding box by defining the bounding box according to six points relative to the corridor. The instructions include instructions to provide the six points of the bounding box as a reduced representation of the object.

In one embodiment, a method for improving a representation of objects in a surrounding environment is disclosed. In one embodiment, the method includes, in response to receiving sensor data depicting the surrounding environment including a corridor that defines a left boundary and a right boundary, identifying at least one object from the sensor data. The method includes transforming segmented data from the sensor data that represents the object into a bounding box by defining the bounding box according to six points relative to the corridor. The method includes providing the six points of the bounding box as a reduced representation of the object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
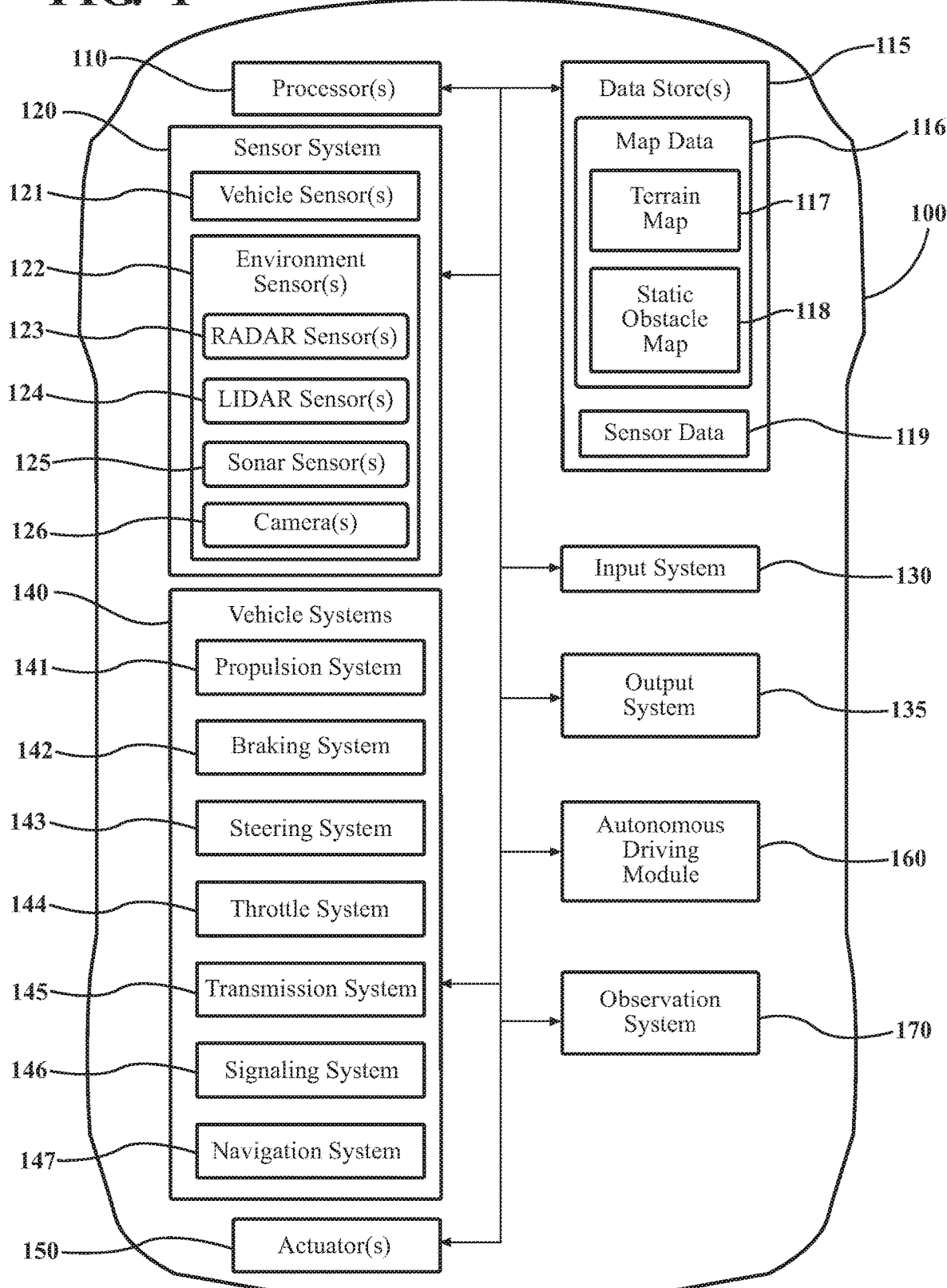
FIG. 1 illustrates one embodiment of a vehicle within which systems and methods disclosed herein may be implemented.

Systems, methods, and other embodiments associated with an improved approach to representing a detected object using a bounding box are disclosed. As previously noted, accurately representing objects detected in a surrounding environment can be a difficult task. For example, using a simple rectangular bounding box can be an oversimplification that results in unoccupied space within an environment appearing to be occupied due to the overextension of the bounding box around the outer boundaries of the object.

Therefore, in one embodiment, an observation system is disclosed that improves the representation of objects identified in a surrounding environment. For example, in one aspect, the disclosed system initially acquires sensor data from one or more sensors that perceive the surrounding environment. The sensor data includes representations of objects that are present within a field-of-view of the sensor. Thus, the disclosed system may identify objects from the sensor data, such as a vehicle or another object. However, because the sensor data may include many data points associated with a single object especially in relation to, for example, a point cloud representation from a LiDAR, using a segment of the sensor data associated with the object for further purposes, such as planning, tracking, and so on is generally computationally infeasible.

As such, the observation system generates a bounding box, and, in particular, a six-point bounding box to represent the object instead of using the segmented sensor data. Moreover, to achieve an adaptable representation using the six-point bounding box that does not over consume void spaces, the observation system leverages a reference system that is custom to the surroundings of the object to define the bounding box. In one or more approaches, the observation system defines the reference system according to a present corridor, which may be a road, lane markers within a road, or another bounded area. In any case, the observation system defines the reference system according to boundaries of the corridor relative to an observing vehicle or another device in which the observation system is functioning. Thus, in the instance of a roadway, the observation system defines a left boundary according to left road boundary relative to a direction of travel of the vehicle, a right road boundary, and a centerline that is parallel to and bisects a space between the left and right boundaries. Accordingly, the reference system is formed relative to an observed section of the corridor per the vehicle.

Using the reference system defined in relation to the corridor, the observation system can then determine defining points of the bounding box for the detected object. In one arrangement, the observation system determines distances in the reference system according to outward points of the object. That is, the object generally has as a shape regardless of the particular class/category where, according to a current orientation, some portion of the vehicle is extending further in each axis of the reference system. The observation system identifies the noted points of the object (also referred to as outward minimums and maximums herein) and projects the points against the reference system to derive the six points defining the bounding box. In one approach, the observation system projects the points by determining a maximum and minimum distance to the right boundary, left boundary, and centerline.

Since the object will have two outermost points in each direction (as viewed from a top-down perspective), the projecting results in the observation system defining the bounding box with, in one approach, six points. In one or more arrangements, the observation model may define the six points using coordinates within the reference system or may otherwise define the points according to six separate distances from the projections that are relative to the boundaries. Thus, the observation system may represent bounding box using, in one approach, just six numbers. In any case, the observation system generates the six-point bounding box as an improved representation of the object that is an efficient and adaptable representation, which avoids difficulties with erroneously defining unoccupied space as occupied.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles but are generally described in relation to automobiles for purposes of description. In yet further embodiments, the vehicle 100 may instead be a statically mounted device (e.g., at an intersection), an embedded device, or another device that generates observations of an environment and, thus, benefits from representing perceived objects using the disclosed approach.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-10 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes an observation system 170 that functions to process sensor data into more efficient representations using the noted bounding boxes in order to further facilitate planning and additional functionality of the vehicle 100. Moreover, while depicted as a standalone component, in one or more embodiments, the observation system 170 is integrated with the autonomous driving module 160, one or more environment sensors 122, or another component of the vehicle 100. The noted functions and methods will become more apparent with a further discussion of the figures.

Figure 2:
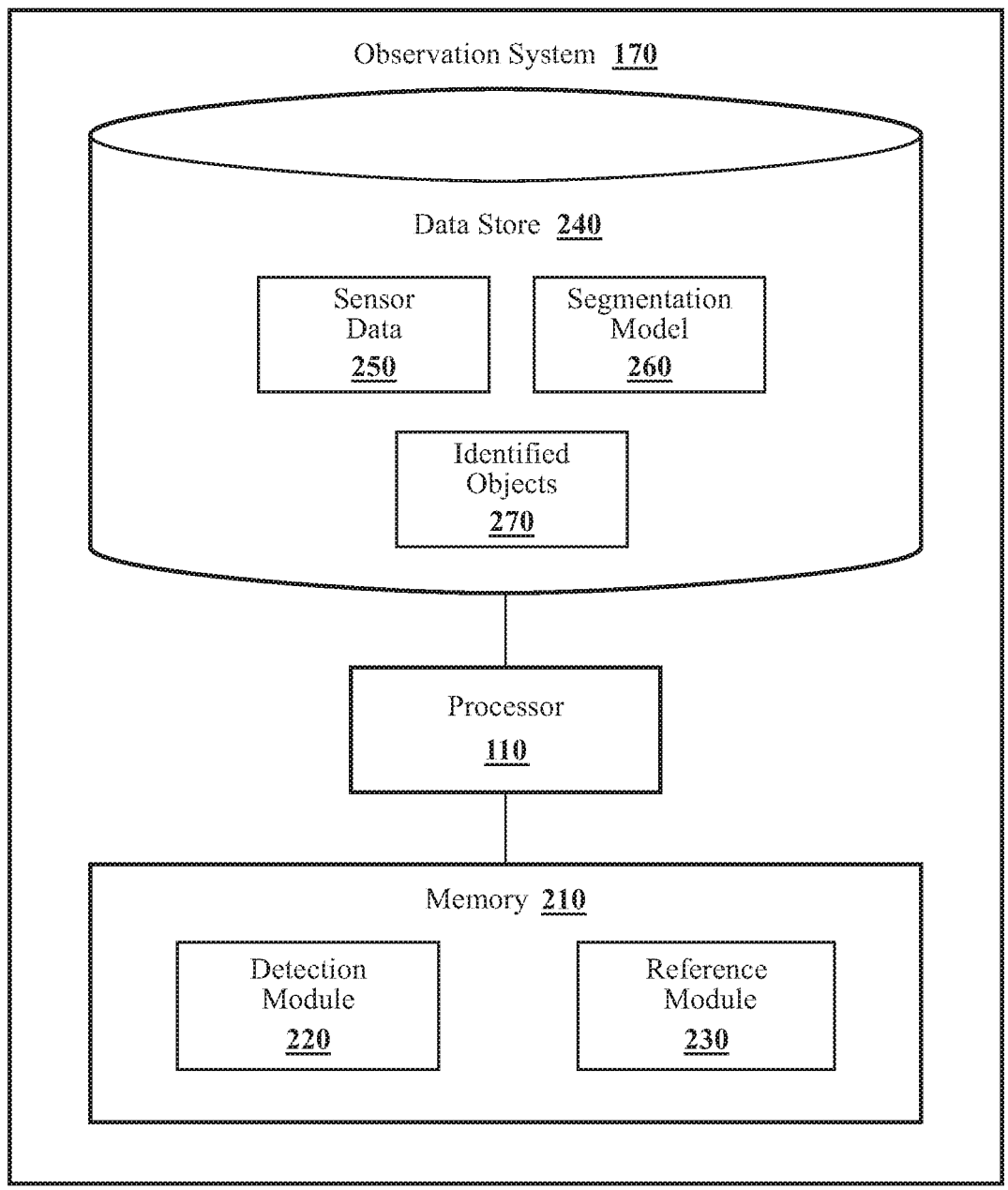
FIG. 2 illustrates one embodiment of an observation system that is associated with representing objects using six-point bounding boxes.

With reference to FIG. 2, one embodiment of the observation system 170 is further illustrated. The observation system 170 is shown as including a processor 110. Accordingly, the processor 110 may be a part of the observation system 170, or the observation system 170 may access the processor 110 through a data bus or another communication path. In one or more embodiments, the processor 110 is an application-specific integrated circuit (ASIC) that is configured to implement functions associated with a detection module 220 and a reference module 230. In general, the processor 110 is an electronic processor such as a microprocessor that is capable of performing various functions as described herein. In one embodiment, the observation system 170 includes a memory 210 that stores the detection module 220 and the reference module 230. The memory 210 is a random-access memory (RAM), read-only memory (ROM), a hard disk drive, a flash memory, or other suitable memory for storing the modules 220 and 230. The modules 220 and 230 are, in at least one arrangement, computer-readable instructions that, when executed by the processor 110, cause the processor 110 to perform the various functions disclosed herein. As such, in one or more aspects, the modules 220 and 230 impart structure to the observation system 170 in the form of the instructions stored in the memory 210, associations with the structure of the processor 110, and the structure of algorithms implemented by the modules 220 and 230.

Furthermore, in one embodiment, the observation system 170 includes a data store 240. The data store 240 is, in one embodiment, an electronic data structure stored in the memory 210 or another electronic storage, and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, a segmentation model 260, and identified objects 270 along with, for example, other information that is used by the modules 220 and 230.

Accordingly, the detection module 220, in one embodiment, controls the one or more respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In general, the sensor data 250 includes information about a surrounding environment of the one or more sensors that acquire the sensor data 250. That is, the sensor data 250 includes perceptions of the one or more sensors within a field-of-view of the sensor(s) making the perception. Thus, the sensor data 250 includes observations of the surrounding environment that depend on the field-of-view of the sensor and placement of the sensor in the environment. Within the context of the vehicle 100, the sensor data 250 may include observations of surrounding vehicles, lane markings, pedestrians, curbs, buildings, traffic signs, and so on. Of course, within other contexts (e.g., indoor), the observations embodied within the sensor data 250 may differ. It should be appreciated that the areas perceived by the sensor(s) may encompass 360 degrees about the vehicle 100 or a narrower perspective. In any case, the sensor data 250 includes information about the surrounding environment of a perceiving sensor.

The sensor data 250 itself can include a single form of data (e.g., a point cloud) or a combination of different data, such as images, radar returns, point clouds, and so on. The sensors may include a LiDAR, a radar, a camera, a sonar, or another sensor. In yet a further aspect, the detection module 220, the autonomous driving module 160, or another component may derive additional information from the sensor data 250.

With further reference to FIG. 2, the observation system 170 further includes the segmentation model 260. In one or more arrangements, the segmentation model 260 performs one or more of instance segmentation and clustering. In general, the particular approach that is undertaken depends, for example, on the form of the sensor data 250. That is, the segmentation model 260 implements an instance segmentation approach where the sensor data 250 is a two-dimensional image comprised of pixels or a similar form of data. By contrast, the segmentation model 260 implements a clustering routine where the sensor data 250 is a three-dimensional point cloud or a similar form of data, including data points throughout a three-dimensional space. In any case, the segmentation model 260 functions to identify discrete objects present in a scene and segment data from the sensor data 250 associated with each object. The segmentation model 260 may provide the segmented data as an output or may simply label or otherwise mark a portion of the sensor data 250 associated with each different object.

In various approaches, the segmentation model 260 is a machine learning algorithm that may have an encoder-decoder architecture or another architecture that is suitable for identifying patterns in the sensor data 250 and grouping data points associated with distinct objects together. For example, the segmentation model 260, in various implementations, may be a centroid-based algorithm, a connectivity-based algorithm, a density-based algorithm (e.g., density-based spatial clustering of applications with noise (DBSCAN)), a k-means clustering algorithm, a Gaussian Mixture Model (GMM), a principal component analysis (PCA) algorithm, a Siamese network, and so on.

Figure 3:
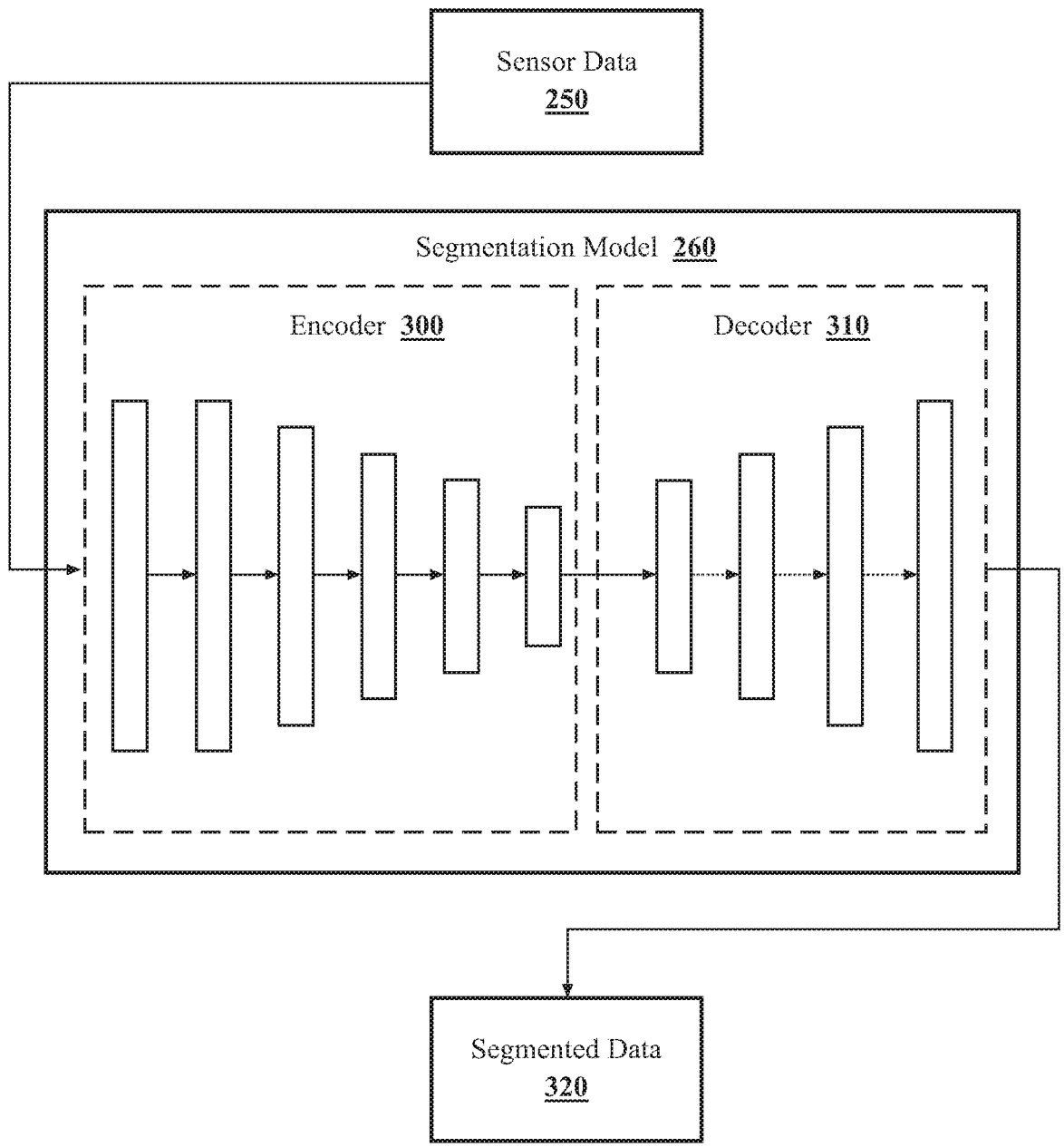
FIG. 3 is a diagram illustrating one example of a segmentation model.

As an additional explanation of one embodiment of the segmentation model 260, consider FIG. 3. FIG. 3 illustrates a detailed view of one implementation of the segmentation model 260. In one embodiment, the segmentation model 260 has an encoder/decoder architecture. The encoder/decoder architecture generally includes a set of neural network layers, including convolutional components (e.g., 2D and/or 3D convolutional layers forming an encoder) that flow into deconvolutional components (e.g., 2D and/or 3D deconvolutional layers forming a decoder). While not illustrated in FIG. 3, the segmentation model 260 may be an autoencoder that further includes a latent space between the encoder 300 and the decoder 310, which is generally a feature space that functions as a mapping of different features. In any case, the encoder 300 accepts the sensor data 250, such as a point cloud produced by a LiDAR, as an electronic input and processes the three-dimensional data to extract clusters of points, which are represented as the segmented data 320. The segmented data 320 is, in general, a portion of the original sensor data 250 associated with a single object depicted in the sensor data 250. While the segmented data 320 is discussed in relation to a single object, it should be appreciated that the model 260 may produce a separate set of segmented data for each object represented in the sensor data 250.

As such, encoding layers that form the encoder 300 functions to, for example, encode features of the sensor data 250 that provide cues to determine cluster/segment associations. In one embodiment, the decoder 310 adapts dimensions of encoded feature vectors to extract the previously encoded spatial information in order to derive the clusters and form the segmented data 320 according to learned correlations associated with the encoded features. That is, the decoding layers generally function to up-sample the previously encoded features into the clusters from which the model 260 can then provide the segmented data 320. Thus, the decoder 310 functions to decode the features back to the appropriate spatial dimensions and, for example, project the determinations against the original sensor data 250. In this way, the segmentation model 260 can produce the segmented data 320. While a particular encoder/decoder architecture is generally illustrated, the segmentation model 260 may take different forms and generally functions to process the sensor data 250 into the segmented data 320, thereby identifying discrete objects within an observed scene.

In any case, the detection module 220, in one or more approaches, implements and applies the segmentation model 260 to the sensor data 250 to produce the identified objects 270 as the segmented data 320. However, as previously noted, the segmented data 320 may not be appropriate for representing the identified objects 270 in various situations, such as within a planning system. Therefore, in one or more arrangements, the reference module 230 generally includes instructions that function to control the processor 110 to execute various algorithmic processes to generate a six-point bounding box from the segmented data 320 to represent the identified objects 270.

Figure 4:
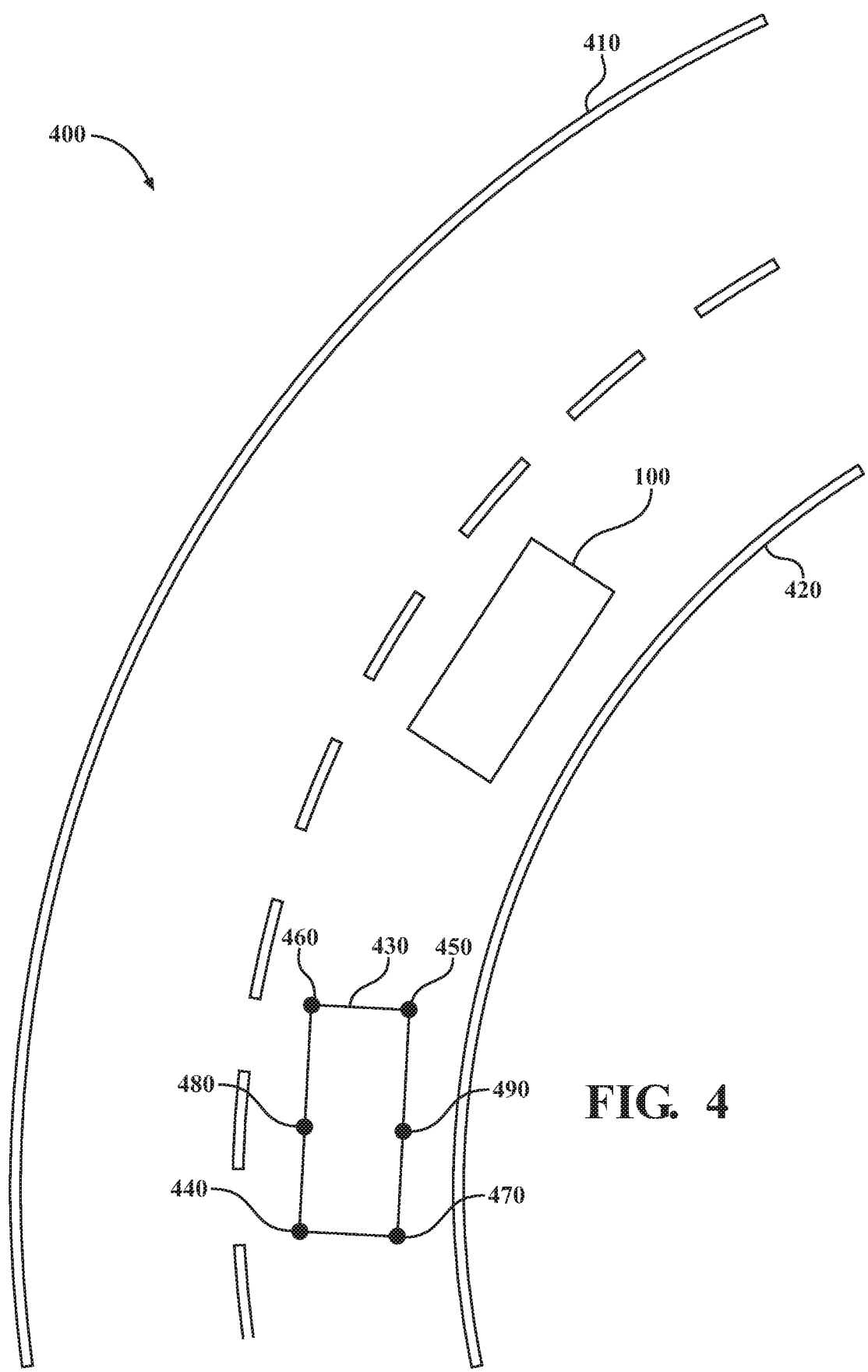
FIG. 4 is a diagram illustrating an overhead view of a roadway with a vehicle.

With reference to FIG. 4 in combination with FIG. 2, a driving scene 400 including a roadway having a left boundary 410 and a right boundary 420 is illustrated. The driving scene 400 further includes the vehicle 100 and an identified object 430, which is another vehicle. As illustrated, the detection module 220 identifies the object 430 from sensor data 250 acquired by the vehicle 100. The detection module 220 then processes the sensor data 250 to provide segmented data representing the object 430.

Prior to defining a bounding box for the identified object 430, the reference module 230 first defines a reference system. As implemented by the observation system 170, the reference system is a coordinate system or frame of reference that is defined relative to the surroundings of the vehicle 100. In general, the reference module 230 defines the reference system according to the corridor within which the vehicle 100 is traveling. The observation system 170 may define the corridor according to boundaries of the roadway or lane on which the vehicle 100 is traveling. Additionally, the reference module 230, in one or more approaches, defines the reference system relative to a direction of travel for the vehicle 100. For example, the reference module 230 may define the reference system according to a point of origin associated with the vehicle 100.

Figure 5:
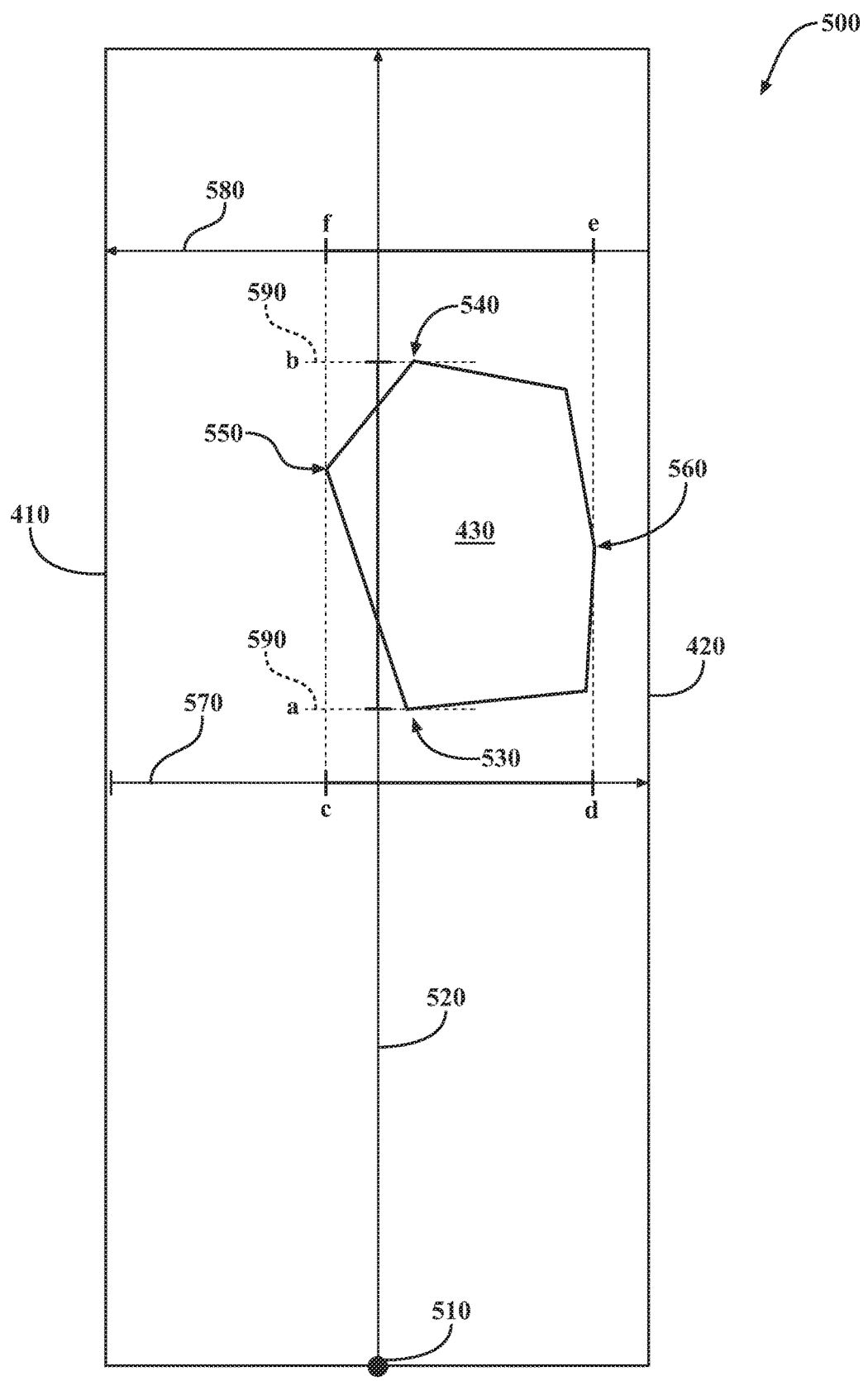
FIG. 5 illustrates a diagram of a corridor with a defined reference system.
Figure 6:
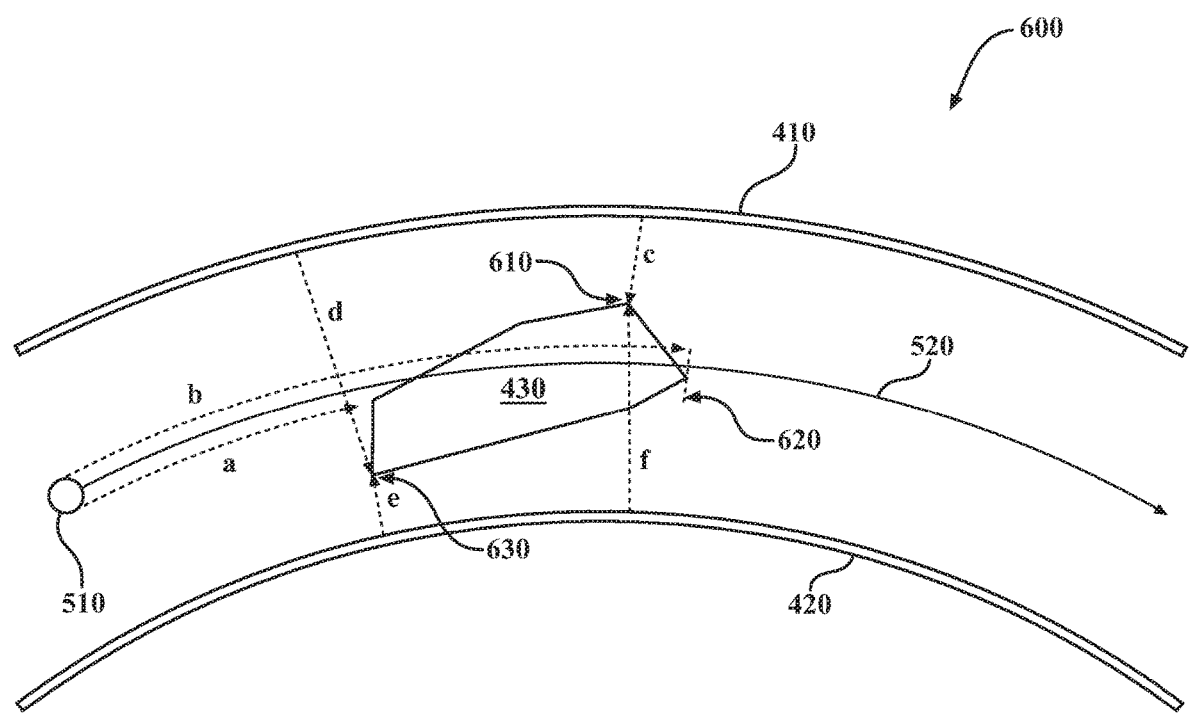
FIG. 6 illustrates a diagram of a curved corridor.

Consider FIGS. 5 and 6, which illustrate separate depictions of the object 430 in different configurations on different roadways. The reference module 230 defines a reference origin 510, in one embodiment, at a point along a centerline 520 between the left boundary 410 and the right boundary 420 associated with the vehicle 100. That is, the reference origin 510 may be defined at a point on the centerline 520 where the vehicle 100 is located (e.g., a center, nose, or rear point). In further aspects, the reference module 230 may define the reference origin 510 according to an arbitrary point along the centerline 520, according to a point of interest (e.g., crosswalk, traffic marker, etc.), according to a defined interval, and so on.

Moreover, the reference module 230 defines the left boundary 410 and right boundary 420, in one or more arrangements, relative to a direction of travel of the vehicle 100. In further approaches, the reference module 230 may define the left boundary 410 and the right boundary 420 in a static manner for a roadway, such as according to cardinal directions (e.g., left is west, right is east). However, as discussed herein, the left and right boundaries are generally relative to the direction of travel for the vehicle 100 with the left boundary 410 being to the left of the vehicle 100 (e.g., driver's side for left-hand drive) according to standard forward motion and the right being to the right (e.g., passenger side) of the vehicle 100. Furthermore, the reference module 230 generally defines the boundaries 410/420 according to actual boundaries denoted by the road itself or according to lane markers. For example, in the context of a three-lane highway, the reference module 230 may define the boundaries 410/420 as the outer markers of the roadway for the direction of travel of the vehicle 100 or according to markers of a particular lane of travel for the vehicle 100.

The reference module 230, in one or more arrangements, defines the centerline 520 (not shown in FIG. 4) by, in one or more approaches, bisecting a space defined between the left and right boundaries 410/420 and in parallel with the left and right boundaries 410/420. Thus, the centerline 520 generally provides a longitudinal reference while the left and right boundaries 410/420 provide lateral references.

Once the reference module 230 defines the reference system, the reference module 230 then, in one approach, determines outermost points on the segmented data of the identified object 430. For example, as illustrated in FIG. 4, points 440, 450, 460, 470, 480, and 490 are intended to represent the six points of the bounding box, and the identified object 430 is generally rectangular. In this instance, the points 480 that are closest to the left boundary, furthest 470 from the left boundary, furthest 460 from the right boundary, closest 490 to the right boundary, closest 450 to the reference origin, and furthest 440 from the reference origin (i.e., furthest from the vehicle 100) define the bounding box.

However, where the identified object 430 is not a rectangle, as shown in FIG. 5, the reference module 230 uses the outward points, which are also referred to as the outermost points, of the object 430 to determine the bounding box points. In FIG. 5, the outward minimums and maximums are points 530, 540, 550, and 560. Thus, the reference module 230 projects the points onto perpendicular reference lines 570 and 580 extended from the left boundary 410 and the right boundary 420 and onto the centerline 520 via projections 590. The points of intersection onto the reference lines a, b, c, d, e, f are the six points that define the six-point bounding box. The points a, b, c, d, e, f represent distances from the respective component of the reference system to the outward points of the identified object 430. That is, point "a" represents a closest point of the object 430 to the origin 510. Point "b" represents a furthest point from the origin 510. Point "c" represents a closest point to the left boundary 410. Point "d" represents a furthest point to the left boundary 410. Point "e" represents a point closest to the right boundary 420. Point "f" represents a point furthest from the right boundary 420. Thus, the reference module 230 can, in one approach, represent each of the points a, b, c, d, e, and f as distances relative to the axis of the reference system. In this way, the reference module 230 transforms the segmented data from the sensor data 250 into a six-point bounding box relative to the corridor.

FIG. 6 further illustrates this process in relation to the roadway 600 that is curved. When the roadway is curved, the reference module 230 adjusts the reference lines used to project the outward points to account for the curvature. FIG. 6 illustrates the object 430 as including three outward points 610, 620, and 630. There are only three points since 630 represents a rightmost point and a closest point to the origin 510. Otherwise, the reference module 230 accounts for the curvature by projecting the points 610, 620, and 630 using separate perpendicular projections to each reference line. It should be appreciated that in various approaches, the reference module 230 may implement a search algorithm over the segmented data associated with the identified object 430. For example, the reference module 230, in one arrangement, iteratively compare points along a border of the identified object 430 to identify minimums and maximums in relation to outward projection.

In any case, in contrast to the approach shown in FIG. 5, the approach in FIG. 6 may have multiple projections per point to determine the bounding box points due to the curve of the roadway 600. For example, in relation to the centerline 520, as shown in FIG. 6, the projection from point 630 include points "e" and "d" that are formed according to perpendicular projections from a tangent along the arc of the respective boundary 420 and 410. In other words, to account for the curvature of the roadway 600, the reference module identifies a point at which the tangent of the arc of the boundary can be projected to the respective point using a reference line that runs perpendicular to the tangent. In this way, the reference module 230 determines the distances for the left and right boundaries for the laterally defining points c, d, and e, f.

For the longitudinal points a and b, the reference module 230 determines a distance along the centerline 520 from the origin 510. As shown in FIG. 6, the reference module 230 derives points a and b by projecting a reference line along the centerline 520 and determining the distance according to a point where a perpendicular projection intersects with the outward points (i.e., closest and furthest) on the identified object 430. In this way, the reference module 230 transforms segmented data from the sensor data that represents the object into the bounding box even when the roadway is curving or otherwise not straight. This approach to forming the bounding box further defines the bounding box relative to the corridor, thereby improving the representation to avoid overextension of the bounding box into unoccupied space, as shown further with FIGS. 9 and 10.

Once defined, the reference module 230 provides the six points of the bounding box as a reduced representation of the identified object for use by further determinations or systems of the vehicle 100. For example, in one or more approaches, the vehicle 100 may be an autonomous vehicle, semi-autonomous vehicle, and/or a vehicle that includes various driving assistance systems. Thus, the vehicle 100 may perform additional functions, such as path planning, obstacle recognition, obstacle avoidance, emergency stopping, and so on. In any case, the reference module 230, in one or more approaches, may provide the six-point bounding box into the autonomous driving module 160 or another system of the vehicle 100 so that the further systems can utilize a more efficient representation of the identified objects 270 and thereby more efficiently plan maneuvers of the vehicle 100 and/or perform other functions using the six-point bounding box. In at least one approach, the reference module 230 may be integrated with a planning component of the autonomous driving module 160 to facilitate representing identified objects using the noted approach and thereby causing the module 160 to adapt control of the vehicle 100 to better account for occupied space of the identified objects 270.

Figure 7:
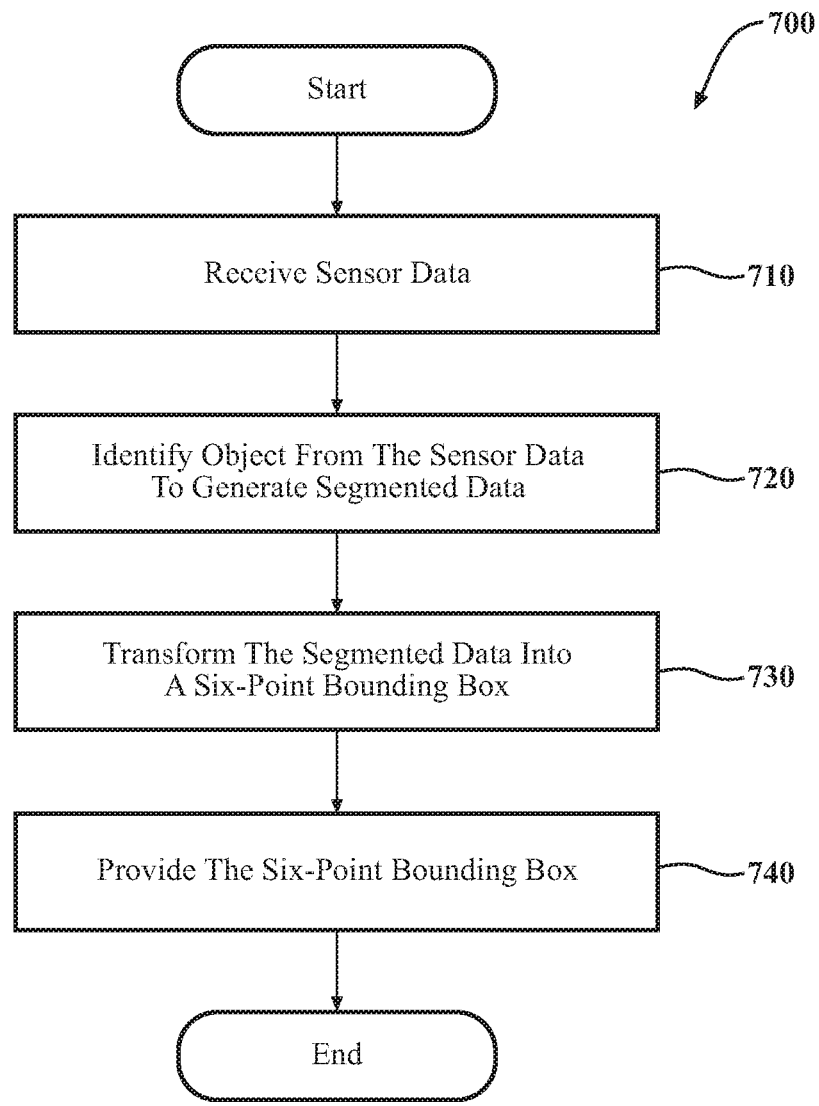
FIG. 7 is a flowchart of one embodiment of a method associated with generating a bounding box representation for an identified object.

Additional aspects of representing an object using a bounding box will be discussed in relation to FIG. 7. FIG. 7 illustrates a flowchart of a method 700 that is associated with identifying objects in a surrounding environment and using a six-point bounding box to represent the objects. Method 700 will be discussed from the perspective of the observation system 170 of FIGS. 1-2. While method 700 is discussed in combination with the observation system 170, it should be appreciated that the method 700 is not limited to being implemented within the observation system 170 but is instead one example of a system that may implement the method 700.

At 710, the detection module 220 acquires the sensor data 250. In one embodiment, the reference module 230 acquires the sensor data 250 locally from co-located systems with the observation system 170 (e.g., the camera 126), while in further embodiments, the reference module 230 may acquire the sensor data 250 through a communication link with a remote system. Thus, while the observation system 170 can be implemented within a particular device that is, for example, actively navigating an environment, the observation system 170 may also function as a cloud-based computing service to analyze the sensor data 250 or as a statically mounted device in an environment (e.g., mounted to a traffic signal). As previously described, the sensor data 250 itself may have different characteristics according to different implementations but generally includes observations of a surrounding environment from which objects may be identified.

At 720, the detection module 220 identifies at least one object from the sensor data 250. As previously described, the detection module 220 may segment the object from the sensor data using a segmentation model to provide segmented data representing individual objects in the surrounding environment. Of course, in further implementations, the detection module 220 may implement other routines or models to generate the segmented data. In any case, the detection module 220 generally functions to acquire the sensor data 250 and derive observations of objects therefrom. Thus, the detection module 220 performs various functions to facilitate the derivation of observations about the surrounding environment from which further determinations may be performed.

At 730, the reference module 230 transforms the segmented data from the detection module 220 that represents the object into a bounding box. In various arrangements, the reference module 230 first defines a reference system in which to define the bounding box. Thus, the reference module 230 may be iteratively determining boundaries of the reference system as the vehicle 100 progresses through the environment. For example, as configurations of a roadway change, the reference module 230 can adapt the reference system to conform with changing boundaries (e.g., lanes or road boundaries). In any case, the reference module 230 generates the bounding box by defining the bounding box according to six points relative to the corridor (e.g., roadway).

At 740, the reference module 230 provides the six points of the bounding box as a reduced representation of the object. In one arrangement, the reference module 230 provides the bounding box to a planning system to cause the planning system to plan movements of the vehicle 100 using the bounding box as an indicator of a form of the object. The object may be an obstacle within the roadway, and, thus, the bounding box functions to represent an occupied area that is impassable. As such, the reference module 230 provides the bounding box to cause the vehicle 100 to navigate around the obstacle with an improved knowledge of an area occupied by the object. In further aspects, the reference module 230 may provide the bounding box directly to a control function of the vehicle 100 (e.g., autonomous driving module 160) in order to control the vehicle 100 to avoid the obstacle either through planned movements or as an emergency maneuver.

Figure 8:
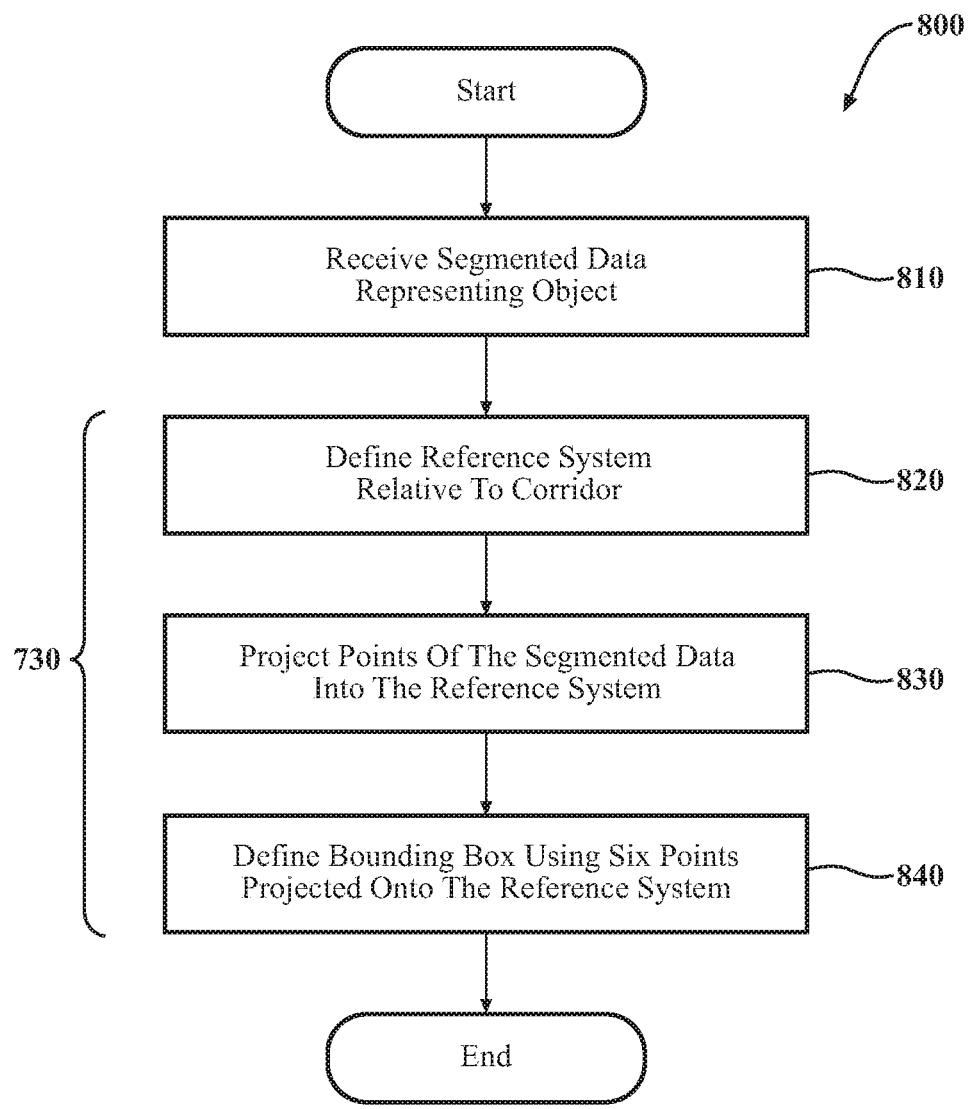
FIG. 8 is a flowchart of one embodiment of a method associated with deriving a six-point bounding box within a defined reference system.

As a further explanation of how the reference module 230 produces the six-point bounding box, consider FIG. 8, which illustrates a flowchart of a method 800 that is associated with defining a reference system and generating a bounding box therein. Method 800 will be discussed from the perspective of the observation system 170 of FIGS. 1-2. While method 800 is discussed in combination with the observation system 170, it should be appreciated that the method 800 is not limited to being implemented within the observation system 170 but is instead one example of a system that may implement the method 800.

At 810, the reference module 230 receives the segmented data representing an identified object from the detection module 220. As previously explained, the detection module 220 processes the sensor data 250 using various approaches to extract data associated with distinct objects. In any case, the reference module 230 uses the segmented data to derive the six-point bounding box and improve the representation to a more efficient form in both data quantity and format.

At 820, the reference module 230 defines a reference system using a left boundary, a right boundary, and a centerline associated with a corridor in which the vehicle 100 is traveling. The corridor is generally a road, such as a highway, street, or similar driveable area. In further aspects, the corridor may include an offroad course, bike path, or another navigable area. In any case, the reference module 230 uses the corridor to define aspects of the reference system. For example, the reference module 230 uses left and right boundaries (e.g., road boundaries or lane markers) to define the reference system by basing the reference system off of these lateral limits from which the reference module can project and derive the points of the bounding box.

The reference module 230 further defines the centerline by, in at least one approach, bisecting a space between the left boundary and the right boundary in parallel with the boundaries to provide a longitudinal reference along the corridor. The reference module 230 similarly uses the centerline to project and define the points as discussed further subsequently.

At 830, the reference module 230 projects reference points of the object into the reference system to derive the six points. The reference points are outward boundary minimums and maximums relative to the reference system. As previously explained, the reference points are points that are closest to and/or furthest from the components of the reference system. Accordingly, the reference module 230 projects the reference points against the centerline, a left reference that indicates a distance from the left boundary, and a right reference that indicates a distance from the right boundary. As previously noted, in various approaches, the left and right reference may include multiple references for a corridor that is curved.

At 840, the reference module 230 defines the bounding box according to the projected points in the reference system. The six points include right boundary distance points specifying a perpendicular distance of a closest point and a furthest point to the right boundary, left boundary distance points specifying a closest point and a furthest point to the left boundary, and centerline distance points specifying a furthest point and a closest point along the centerline relative to a point of origin. The combination of points generally define a convex hull and may be specified as simple distances to the components of the reference system. In this way, the observation system improves the representation of the identified objects to provide a more efficient and accurate construct for subsequent determinations.

Figure 9:
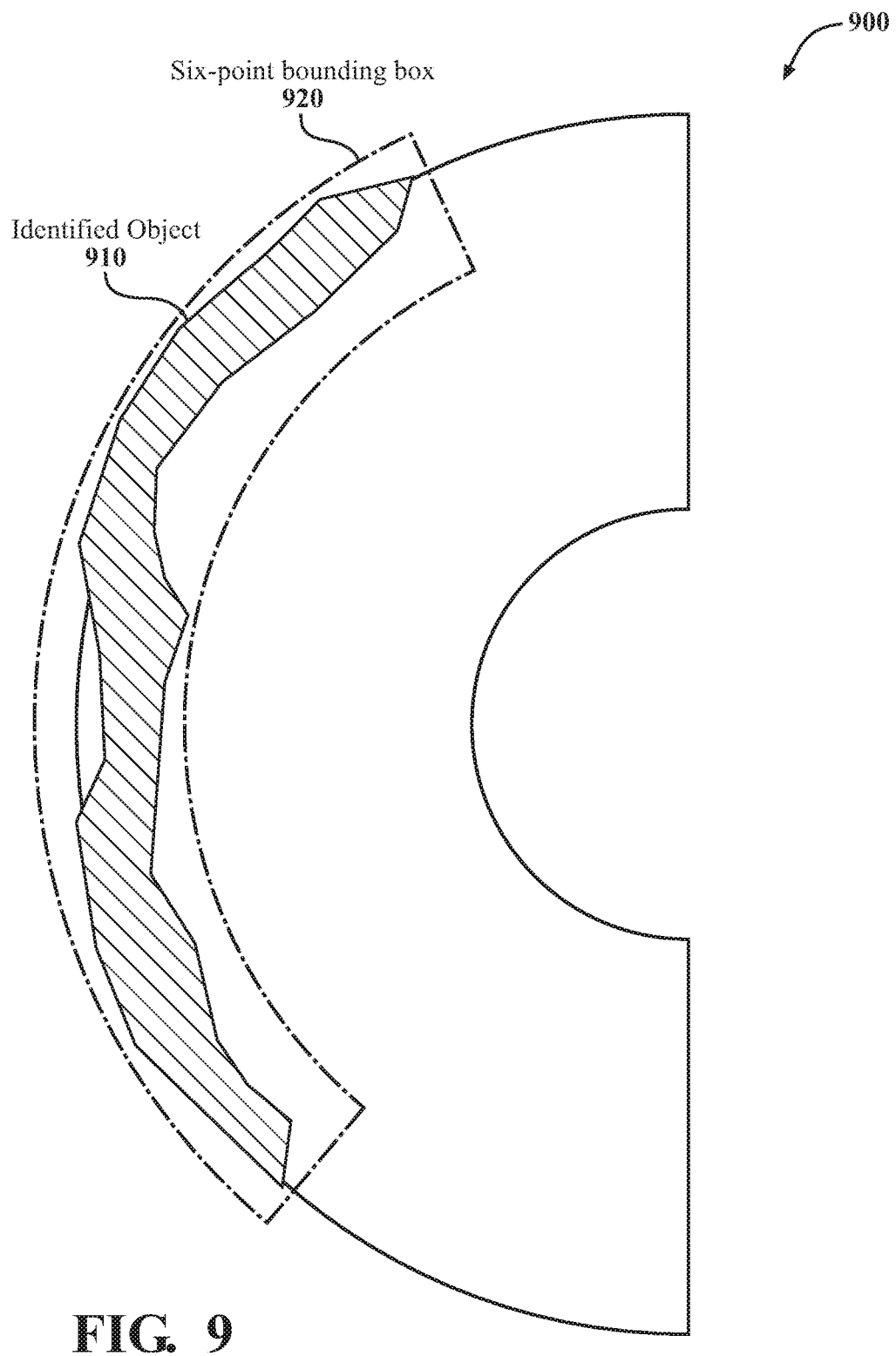
FIG. 9 illustrates a diagram of one example of a six-point bounding box in relation to a curved roadway.
Figure 10:
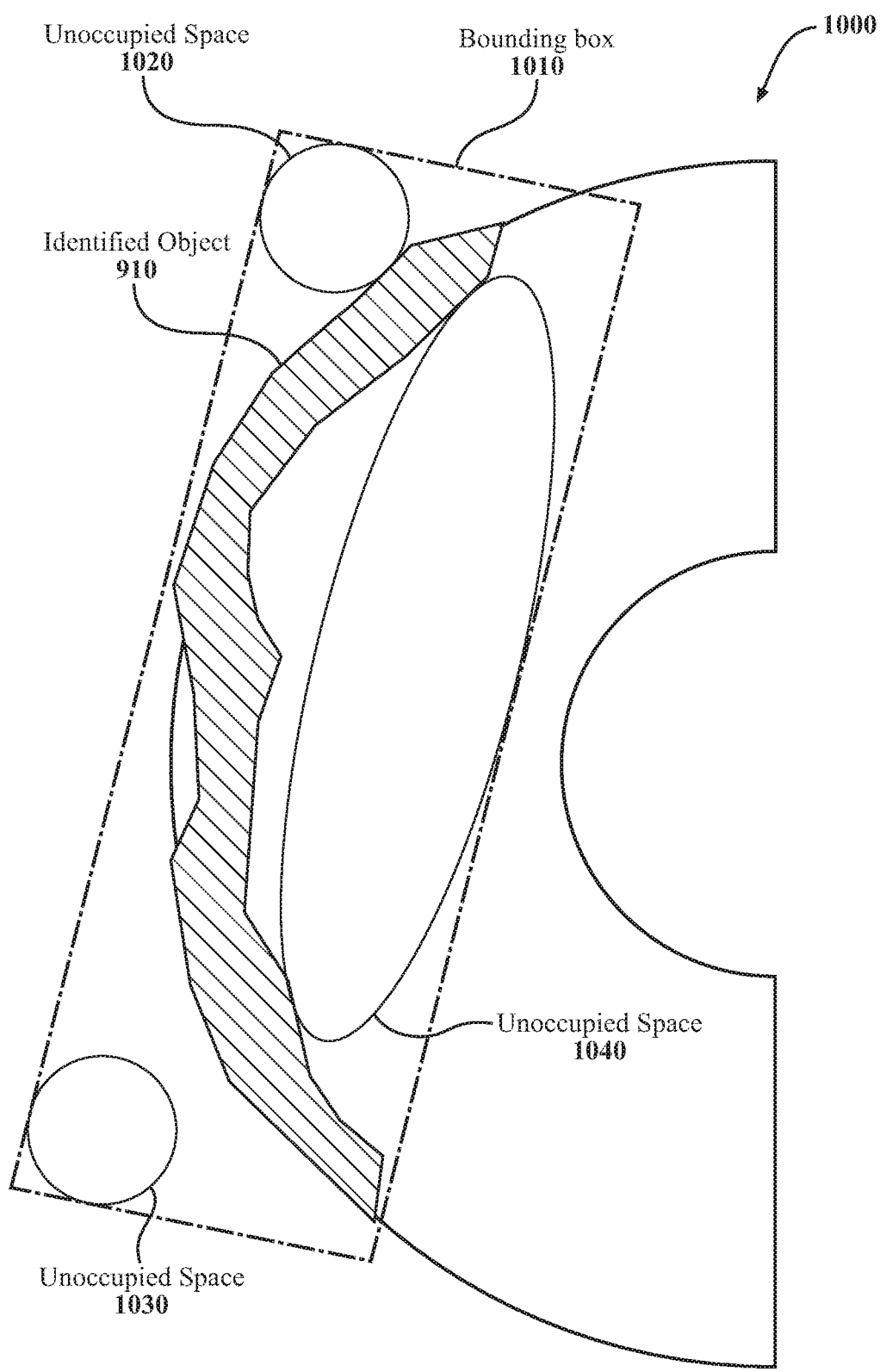
FIG. 10 illustrates a diagram of one example of a bounding box defined as a rectangle relative to a curved roadway.

Further explanation of how the observation system 170 improves the representation of identified objects 270 will be described in relation to examples that are illustrated in FIGS. 9-10. FIG. 9 illustrates an example of a curved roadway 900 that includes an identified object 910. As illustrated, the identified object curves with the roadway and is represented by a six-point bounding box 920 as generated by the observation system 170. The bounding box 920 curves with the curvature of the roadway since the reference system is defined relative to the roadway. As such, the bounding box 920 includes little unoccupied space and closely approximates boundaries of the identified object 910.

By contrast, FIG. 10 illustrates an example of a curved roadway 1000 that includes the same identified object 910. However, the bounding box 1010 is a standard rectangular bounding box that is not defined in relation to the roadway and therefore extends beyond the form of the object 910 to consume unoccupied space. As shown, unoccupied space 1020, 1030, and 1040 consumes a signification portion of the bounding box. Moreover, because of the extension of the bounding box 1010 beyond the object 910 itself, a significant portion of the roadway 1000 appears to be occupied from the perspective of a device using the bounding box 1010 as a source of passable regions. Thus, the bounding box 1010 may unduly alter planning associated with navigating around the object 910 because of the overextension that is not adapted for the curvature of the object 910 along the roadway 1000.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the observation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the observation system 170, and/or the autonomous driving module(s) 160 may control some or all of these vehicle systems 140 and, thus, may be partially or fully autonomous.

The processor(s) 110, the observation system 170, and/or the autonomous driving module(s) 160 can be operatively connected to communicate with the various vehicle systems 140 and/or individual components thereof. For example, returning to FIG. 1, the processor(s) 110, the observation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the observation system 170, and/or the autonomous driving module(s) 160 may control some or all of these vehicle systems 140.

The processor(s) 110, the observation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the observation system 170, and/or the autonomous driving module(s) 160 can control the direction and/or speed of the vehicle 100. The processor(s) 110, the observation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the observation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An observation system for improving a representation of objects in a surrounding environment, comprising:
   one or more processors;
   a memory communicably coupled to the one or more processors and storing:
   a detection module including instructions that, when executed by the one or more processors, cause the one or more processors to, in response to receiving sensor data depicting the surrounding environment including a corridor that defines a left boundary and a right boundary, identify at least one object from the sensor data; and
   a reference module including instructions that, when executed by the one or more processors, cause the one or more processors to transform segmented data from the sensor data that represents the object into a bounding box by defining the bounding box according to six points relative to the corridor as references of distance within a two-dimensional space to the left boundary and the right boundary,
   wherein the reference module further includes instructions to provide the six points of the bounding box as a reduced representation of the object.

2. The observation system of claim 1, wherein the reference module includes instructions to transform the segmented data into the bounding box including instructions to:
   define a reference system using the left boundary, the right boundary, and a centerline that approximately bisects a space in parallel between the left boundary and the right boundary, and
   project reference points of the object into the reference system to derive the six points, wherein the reference points are outward boundary minimums and outward boundary maximums relative to the reference system.

3. The observation system of claim 2, wherein the reference module includes instructions to project the reference points including instructions to project the outward boundary minimums and the outward boundary maximums against the centerline, a left reference that indicates a distance from the left boundary, and a right reference that indicates a distance from the right boundary.

4. The observation system of claim 2, wherein the six points include right boundary distance points specifying a perpendicular distance of a closest point and a furthest point to the right boundary, left boundary distance points specifying a closest point and a furthest point to the left boundary, and centerline distance points specifying a furthest point and a closest point along the centerline relative to a point of origin.

5. The observation system of claim 1, wherein the corridor is a roadway,
wherein the left boundary and right boundary are defined relative to a vehicle that acquires the sensor data and a direction of travel of traffic associated with the vehicle, and
wherein the bounding box defines a convex hull.

6. The observation system of claim 1, wherein the detection module includes instructions to receive the sensor data including instructions to acquire the sensor data from at least one sensor of a vehicle, and
wherein the detection module includes instructions to identify the at least one object from the sensor data including instructions to segment the object from the sensor data using a segmentation model that is a machine-learning model.

7. The observation system of claim 1, wherein the reference module includes instructions to provide the bounding box including instructions to plan movements of a vehicle using the bounding box as an indicator of a form of the object that is an obstacle for the vehicle to navigate, and controlling the vehicle according to the movements.

8. The observation system of claim 1, wherein the observation system is integrated within an autonomous vehicle.

9. A non-transitory computer-readable medium for improving a representation of objects in a surrounding environment, and including instructions that, when executed by one or more processors, cause the one or more processors to:
in response to receiving sensor data depicting the surrounding environment including a corridor that defines a left boundary and a right boundary, identify at least one object from the sensor data; and
transform segmented data from the sensor data that represents the object into a bounding box by defining the bounding box according to six points relative to the corridor as references of distance within a two-dimensional space to the left boundary and the right boundary,
provide the six points of the bounding box as a reduced representation of the object.

10. The non-transitory computer-readable medium of claim 9, wherein the instructions to transform the segmented data into the bounding box include instructions to:
define a reference system using the left boundary, the right boundary, and a centerline that approximately bisects a space in parallel between the left boundary and the right boundary, and
project reference points of the object into the reference system to derive the six points, wherein the reference points are outward boundary minimums and outward boundary maximums relative to the reference system.

11. The non-transitory computer-readable medium of claim 10, wherein the instructions to project the reference points include instructions to project the outward boundary minimums and the outward boundary maximums against the centerline, a left reference that indicates a distance from the left boundary, and a right reference that indicates a distance from the right boundary.

12. The non-transitory computer-readable medium of claim 10, wherein the six points include right boundary distance points specifying a perpendicular distance of a closest point and a furthest point to the right boundary, left boundary distance points specifying a closest point and a furthest point to the left boundary, and centerline distance points specifying a furthest point and a closest point along the centerline relative to a point of origin.

13. The non-transitory computer-readable medium of claim 9, wherein the corridor is a roadway,
wherein the left boundary and right boundary are defined relative to a vehicle that acquires the sensor data and a direction of travel of traffic associated with the vehicle, and
wherein the bounding box defines a convex hull.

14. A method of improving a representation of objects in a surrounding environment, comprising:
in response to receiving sensor data depicting the surrounding environment including a corridor that defines a left boundary and a right boundary, identifying at least one object from the sensor data;
transforming segmented data from the sensor data that represents the object into a bounding box by defining the bounding box according to six points relative to the corridor as references of distance within a two-dimensional space to the left boundary and the right boundary; and
providing the six points of the bounding box as a reduced representation of the object.

15. The method of claim 14, wherein transforming the segmented data into the bounding box includes:
defining a reference system using the left boundary, the right boundary, and a centerline that approximately bisects a space in parallel between the left boundary and the right boundary; and
projecting reference points of the object into the reference system to derive the six points, wherein the reference points are outward boundary minimums and maximums relative to the reference system.

16. The method of claim 15, wherein projecting the reference points includes projecting outward boundary minimums and maximums against the centerline, a left reference that indicates a distance from the left boundary, and a right reference that indicates a distance from the right boundary.

17. The method of claim 15, wherein the six points include right boundary distance points specifying a perpendicular distance of a closest point and a furthest point to the right boundary, left boundary distance points specifying a closest point and a furthest point to the left boundary, and centerline distance points specifying a furthest point and a closest point along the centerline relative to a point of origin.

18. The method of claim 14, wherein the corridor is a roadway, wherein the left boundary and right boundary are defined relative to a vehicle that acquires the sensor data and a direction of travel of traffic associated with the vehicle, wherein the bounding box defines outward extents using only the six points relative to the corridor, and
wherein the bounding box defines a convex hull.

19. The method of claim 14, wherein receiving the sensor data includes acquiring the sensor data from at least one sensor of a vehicle, and wherein identifying the at least one object from the sensor data includes segmenting the object from the sensor data using a segmentation model that is a machine-learning model.

20. The method of claim 14, wherein providing the bounding box includes planning movements of a vehicle using the bounding box as an indicator of a form of the object that is an obstacle for the vehicle to navigate, and controlling the vehicle according to the movements.

\* \* \* \* \*